United States Patent
Liao et al.

(10) Patent No.: US 10,033,249 B2
(45) Date of Patent: Jul. 24, 2018

(54) MOBILE INDUCTION AND POWER-GENERATION DEVICE

(71) Applicant: SunRising ECO-Friendly Tech. Co., Ltd., Taichung (TW)

(72) Inventors: Kuangyang Liao, Taichung (TW); Jenn-Kai Tsai, Taichung (TW)

(73) Assignee: Sunrising Eco-Friendly Tech. Co., Ltd., Taichung (TW)

( * ) Notice: Subject to any disclaimer, the term of this patent is extended or adjusted under 35 U.S.C. 154(b) by 0 days.

(21) Appl. No.: 15/026,667

(22) PCT Filed: Oct. 14, 2013

(86) PCT No.: PCT/CN2013/001232
§ 371 (c)(1),
(2) Date: Apr. 1, 2016

(87) PCT Pub. No.: WO2015/054803
PCT Pub. Date: Apr. 23, 2015

(65) Prior Publication Data
US 2016/0254727 A1    Sep. 1, 2016

(51) Int. Cl.
| | |
|---|---|
| *F02B 63/04* | (2006.01) |
| *H02K 7/18* | (2006.01) |
| *H02K 35/02* | (2006.01) |
| *F03G 7/08* | (2006.01) |
| *B62J 6/06* | (2006.01) |
| *H02K 21/14* | (2006.01) |
| *H02K 49/10* | (2006.01) |
| *H02K 7/06* | (2006.01) |

(52) U.S. Cl.
CPC .............. *H02K 7/1892* (2013.01); *B62J 6/06* (2013.01); *F03G 7/08* (2013.01); *H02K 21/14* (2013.01); *H02K 35/02* (2013.01); *H02K 49/102* (2013.01)

(58) Field of Classification Search
USPC .................................... 290/1 R; 310/80, 103
See application file for complete search history.

(56) References Cited

U.S. PATENT DOCUMENTS 3,360,704 A * 12/1967 Kohlhagen .............. G04C 3/10
310/21
3,864,586 A * 2/1975 Saito ........................ G04C 3/10
310/21

(Continued)

FOREIGN PATENT DOCUMENTS

| CN | 1407708 A | 4/2003 |
|---|---|---|
| CN | 101197550 A | 6/2008 |
| DE | 2817169 C2 | 10/1986 |

*Primary Examiner* — Pedro J Cuevas
(74) *Attorney, Agent, or Firm* — Alan D. Kamrath; Kamrath IP Lawfirm, P.A.

(57) ABSTRACT

A mobile induction and power-generation device includes a disc-shaped magnet, a block magnet, and a coil. The block magnet has at least one magnetic pole set each having two adjacent magnetic poles with opposite polarities, and the at least one magnetic pole set moves along a movement trajectory relative to the disc-shaped magnet. The coil is disposed adjacent to the disc-shaped magnet or the block magnet, is induced by an alternating magnetic field generated by the movements of the disc-shaped magnet or the block magnet, and generates an induction current due to the alternating magnetic field.

1 Claim, 7 Drawing Sheets

(56) References Cited

U.S. PATENT DOCUMENTS

| | | | | |
|---|---|---|---|---|
| 4,196,365 A * | 4/1980 | Presley | H02K 49/10 | 310/103 |
| 4,207,773 A * | 6/1980 | Stahovic | H02K 49/10 | 310/103 |
| 4,237,347 A * | 12/1980 | Burundukov | H04R 11/04 | 369/136 |
| 4,598,221 A * | 7/1986 | Lawson | H02K 53/00 | 310/103 |
| 4,901,357 A * | 2/1990 | Albright | H02K 33/16 | 381/396 |
| 5,347,186 A * | 9/1994 | Konotchick | H02K 7/1876 | 310/17 |
| 5,455,474 A * | 10/1995 | Flynn | H02K 21/24 | 310/152 |
| 6,021,097 A * | 2/2000 | Kanno | G04C 3/14 | 368/157 |
| 6,084,322 A * | 7/2000 | Rounds | H02K 53/00 | 310/103 |
| 6,147,422 A * | 11/2000 | Delson | H02K 23/00 | 273/148 R |
| 6,166,465 A * | 12/2000 | Fujita | B06B 1/045 | 310/103 |
| 6,220,719 B1 * | 4/2001 | Vetorino | F21L 13/06 | 362/192 |
| 6,501,357 B2 * | 12/2002 | Petro | H01F 7/13 | 310/17 |
| 6,700,248 B2 * | 3/2004 | Long | A63H 33/26 | 310/103 |
| 6,768,230 B2 * | 7/2004 | Cheung | F16C 33/1035 | 290/1 R |
| 6,798,090 B2 * | 9/2004 | Cheung | H02K 35/02 | 290/1 A |
| 6,812,583 B2 * | 11/2004 | Cheung | H02K 35/02 | 290/1 A |
| 6,812,598 B2 * | 11/2004 | Cheung | H02K 35/02 | 290/1 R |
| 6,867,514 B2 * | 3/2005 | Fecera | H02K 53/00 | 310/103 |
| 6,930,421 B2 * | 8/2005 | Wise | H02K 7/025 | 310/103 |
| 7,145,276 B2 * | 12/2006 | Wise | H02K 7/025 | 310/103 |
| 7,148,583 B1 * | 12/2006 | Shau | H02K 7/1876 | 290/1 A |
| 7,151,332 B2 * | 12/2006 | Kundel | H02K 49/10 | 310/20 |
| 7,227,439 B2 * | 6/2007 | Kelly | H01F 7/066 | 310/12.24 |
| 7,268,454 B2 * | 9/2007 | Wise | H02K 7/025 | 310/103 |
| 7,279,818 B1 * | 10/2007 | Wise | H02K 7/025 | 310/103 |
| 7,279,819 B2 * | 10/2007 | Wise | H02K 7/025 | 310/103 |
| 7,285,888 B1 * | 10/2007 | Wise | H02K 7/025 | 310/103 |
| 7,288,860 B2 * | 10/2007 | Cheung | H02K 35/02 | 290/1 R |
| 7,312,548 B2 * | 12/2007 | Wise | H02K 7/025 | 310/103 |
| 7,329,974 B2 * | 2/2008 | Wise | H02K 7/025 | 310/103 |
| 7,336,010 B2 * | 2/2008 | Wise | H02K 7/025 | 310/103 |
| 7,336,011 B2 * | 2/2008 | Wise | H02K 7/025 | 310/103 |
| 7,342,337 B2 * | 3/2008 | Wise | H02K 7/025 | 310/103 |
| 7,345,372 B2 * | 3/2008 | Roberts | F03G 7/08 | 290/1 A |
| 7,382,106 B2 * | 6/2008 | Kundel | H02K 49/10 | 310/15 |
| 7,385,325 B2 * | 6/2008 | Tkadlec | H02K 49/102 | 310/152 |
| 7,400,069 B2 * | 7/2008 | Kundel | H02K 49/10 | 310/15 |
| 7,453,163 B2 * | 11/2008 | Roberts | F03G 7/08 | 290/1 A |
| 7,608,961 B2 * | 10/2009 | Wise | H02K 7/025 | 310/103 |
| 7,687,956 B2 * | 3/2010 | Wise | H02K 7/025 | 310/103 |
| 7,688,036 B2 * | 3/2010 | Yarger | H01M 6/5033 | 320/137 |
| 7,777,377 B2 * | 8/2010 | Tkadlec | H02K 53/00 | 310/80 |
| RE41,626 E * | 9/2010 | Cheung | H02K 35/02 | 290/1 R |
| 7,847,421 B2 * | 12/2010 | Gardner | F03G 7/08 | 290/1 E |
| 8,030,786 B2 * | 10/2011 | Jackson | H02K 35/02 | 290/1 E |
| 8,084,904 B2 * | 12/2011 | Tkadlec | H02K 49/102 | 310/80 |
| 8,087,186 B2 * | 1/2012 | Rastegar | A43B 7/02 | 290/1 A |
| 8,350,394 B2 * | 1/2013 | Cottone | H01L 41/125 | 290/1 E |
| 8,487,484 B1 * | 7/2013 | Miller, Jr. | H02K 7/06 | 310/12.14 |
| 8,519,584 B2 * | 8/2013 | Tkadlec | H02K 49/102 | 310/80 |
| 8,633,605 B2 * | 1/2014 | Esteve Tinto | H02K 35/02 | 290/1 A |
| 9,118,221 B2 * | 8/2015 | Tkadlec | H02K 49/102 | |
| 9,356,499 B2 * | 5/2016 | Kinoshita | H02K 35/02 | |
| 9,371,856 B2 * | 6/2016 | Kundel | F16C 32/0423 | |
| 2004/0251750 A1 * | 12/2004 | Cheung | H02K 35/02 | 310/23 |
| 2011/0169271 A1 * | 7/2011 | Chen | H02K 35/02 | 290/1 A |
| 2011/0175367 A1 * | 7/2011 | Matsumoto | F03G 7/08 | 290/1 A |
| 2012/0104765 A1 * | 5/2012 | Esteve Tinto | H02K 35/02 | 290/1 A |
| 2014/0265347 A1 * | 9/2014 | Paul | H02K 53/00 | 290/1 A |
| 2015/0054288 A1 * | 2/2015 | Willimczik | F02B 63/04 | 290/1 A |
| 2015/0188389 A1 * | 7/2015 | Wan | F03G 7/08 | 290/1 A |

* cited by examiner

MOBILE INDUCTION AND POWER-GENERATION DEVICE

BACKGROUND OF THE INVENTION

1. Field of Invention

The present invention relates to a generator converting slight movement or vibration into electrical energy.

2. Description of the Related Art

Energy is consumed extensively, and the countries of the world are working very hard to develop environmentally friendly energy, such as solar, wind and water energies.

However, current technologies for movement or vibration-induced electricity generation are inefficient due to construction or manufacturing issues, causing poor performance and restricting development significantly.

SUMMARY OF THE INVENTION

In order to solve the technical problems of usage and development of current technologies for movement or vibration-induced electricity generation due to poor efficiency, the primary objective of the present invention is to provide a novel mobile induction and power-generation device, which employs a vibration-induced generation technology using multiple magnetic elements with relative movement. Thus, the problem of slight vibration or movement being unable to generate electricity efficiently can be solved, providing significant energy converting and collecting effects for slight vibration or movement. Thus, the present invention is very suitable for practical usage.

The objective of the present invention and solving of the above mentioned technical problems are achieved by the following technical solution. A mobile induction and power-generation device in accordance the present invention includes an induction movement magnetic element, a displacement magnetic element, and a coil.

The induction movement magnetic element is able to be driven by an external magnetic field to move along a passive movement trajectory, and the induction movement magnetic element includes at least one magnetic pole set.

The displacement magnetic element has at least one magnetic pole set each having two adjacent magnetic poles with opposite polarities, and the at least one magnetic pole set moves along a movement trajectory relative to the induction movement magnetic element. The displacement magnetic element actuates the induction movement magnetic element to move along the passive movement trajectory.

The coil is disposed adjacent to the induction movement magnetic element or the displacement magnetic element, is induced by an alternating magnetic field generated by the movements of the induction movement magnetic element or the displacement magnetic element, and generates an induction current due to the alternating magnetic field.

The objective of the present invention and solving of the above mentioned technical problems are further achieved by the following technical solutions.

Regarding the mobile induction and power-generation device, the adjacent magnetic poles with opposite polarities of the displacement magnetic element change their polarities repeatedly relative to the induction movement magnetic element when they move along the movement trajectory, making the induction movement magnetic element move along the passive movement trajectory.

Regarding said mobile induction and power-generation device, the induction movement magnetic element includes at least one magnetic pole set and a rotation axle, and the at least one magnetic pole set is disposed in a radial direction of the rotation axle and rotates around the rotation axle.

Regarding said mobile induction and power-generation device, the induction movement magnetic element is disc-shaped and includes a magnetic pole set, and the magnetic pole set has a semicircular N-pole and a semicircular S-pole. The rotation axle is disposed at an axial direction of the induction movement magnetic element, and the direction of the passive movement trajectory is the circumferentially tangent direction of the rotation axle.

Regarding said mobile induction and power-generation device, the two adjacent magnetic poles with opposite polarities of one magnetic pole set of the displacement magnetic element are N-pole and S-pole of a block magnet, and the displacement magnetic element includes a movement promotion element connected to or contacted with the block magnet.

Regarding said mobile induction and power-generation device, the displacement magnetic element includes multiple magnets disposed in a circular arrangement. Two adjacent magnets have opposite magnetic poles, and the circular arrangement of two adjacent magnetic poles with opposite polarities of each magnet is toward a radial direction or an axial direction of a circle.

Regarding said mobile induction and power-generation device, the displacement magnetic element has a single magnetic pole toward the direction of the rotation axle of the induction movement magnetic element and moves back and forth in the radial direction of the rotation axle or moves eccentrically in the axial direction of the rotation axle.

Regarding said mobile induction and power-generation device, the coil is disposed around and outside the induction movement magnetic element.

Regarding said mobile induction and power-generation device, the coil is connected to a load, and the load is a light-emitting device, a wireless signal transmitting module, a sensor, or an electricity storage device.

The present invention has obvious advantages and benefits compared to the prior art. The mobile induction and power-generation device in accordance with the present invention has at least the following advantages and benefits:

1. With the induction movement magnetic element and the displacement magnetic element, the present invention can convert slight vibration delicately to cause the induction movement magnetic element to move, to achieve an effect of electricity generation.

2. Because the magnetic field of the displacement magnetic element interacts with the induction movement magnetic element, the coil is facilitated to be induced by a stronger or more concentrated magnetic field. Thus, an effect of improving electricity generation is achieved.

3. The electricity source of the present invention comes from the induction electricity generated by moving or vibrating magnetic elements to drive the induction movement magnetic element and the coil. With the design of this mechanism, slight vibration can be collected effectively and converted into an electricity output.

4. The present invention can be used to recharge in a distance. The induction movement magnetic element can be mounted in an electricity utilization device, and the displacement magnetic element is moved relative to a coil around the induction movement magnetic element to generate electricity. Thus, excellent and efficient effects of recharging at a distance can be achieved.

In summary, the present invention relates to a mobile induction and power-generation device, which includes an induction movement magnetic element, a displacement magnetic element, and a coil. The induction movement magnetic element is able to be driven by an external magnetic field to move along a passive movement trajectory, and the induction movement magnetic element includes at least one magnetic pole set. The displacement magnetic element has at least one magnetic pole set, each having two adjacent magnetic poles with opposite polarities, and the at least one magnetic pole set moves along a movement trajectory relative to the induction movement magnetic element. The displacement magnetic element actuates the induction movement magnetic element to move along the passive movement trajectory. The coil is disposed adjacent to the induction movement magnetic element or the displacement magnetic element, is induced by an alternating magnetic field generated by the movements of the induction movement magnetic element or the displacement magnetic element, and generates an induction current due to the alternating magnetic field.

Other objectives, advantages and novel features of the invention will become more apparent from the following detailed description when taken in conjunction with the accompanying drawings.

DETAILED DESCRIPTION OF THE INVENTION

In order to further elaborate techniques adopted for achieving the objectives of the present invention and their benefits, specific embodiments, characteristics and benefits of the mobile induction and power-generation device proposed in the present invention are described in detail as follows.

Figure 1:
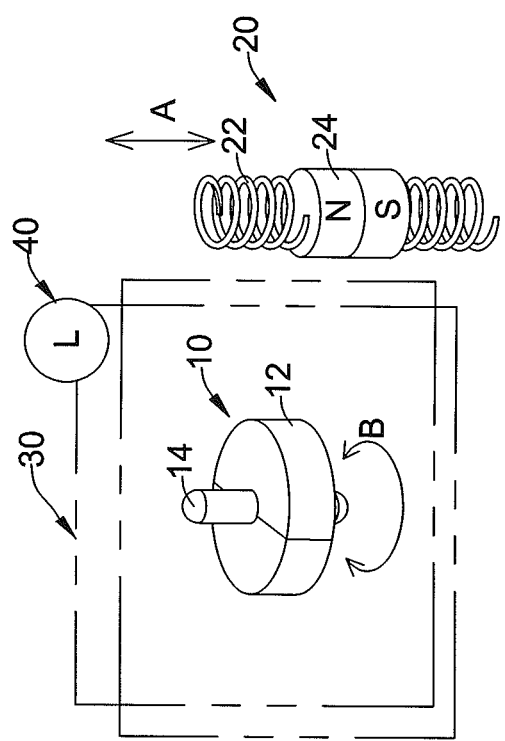
FIG. 1 is a schematic diagram of a construction of a first preferred embodiment in accordance with the present invention.
Figure 2:
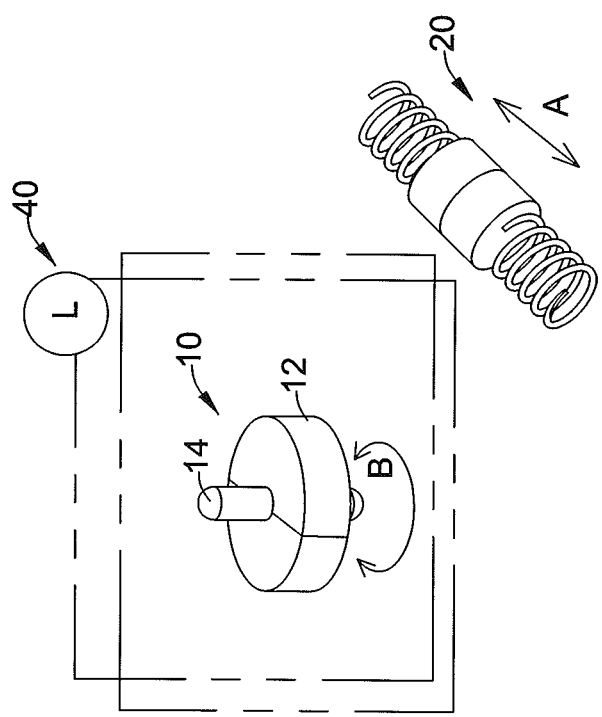
FIG. 2 is a schematic diagram of a construction of a second preferred embodiment in accordance with the present invention.
Figure 3:
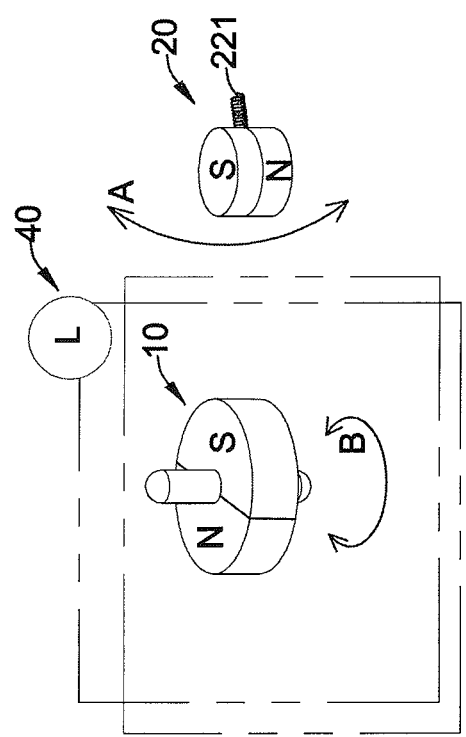
FIG. 3 is a schematic diagram of a construction of a third preferred embodiment in accordance with the present invention.
Figure 4:
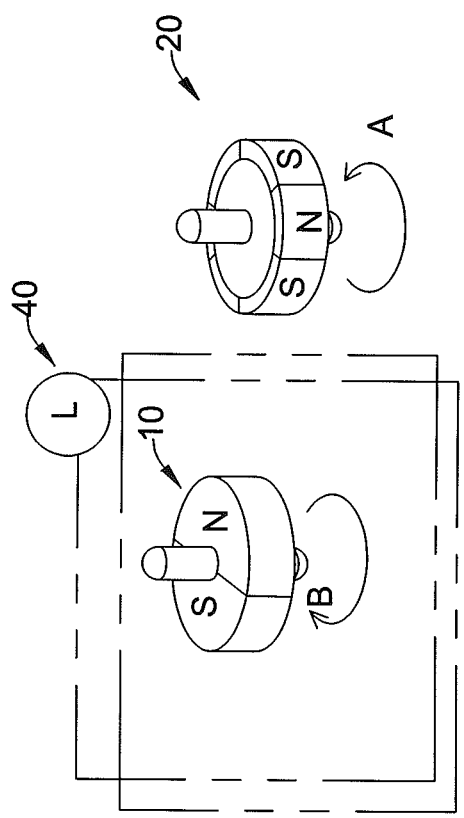
FIG. 4 is a schematic diagram of a construction of a fourth preferred embodiment in accordance with the present invention.

With reference to FIGS. 1 to 4, FIG. 1 is a schematic diagram of a construction of a first preferred embodiment in accordance with the present invention. FIG. 2 is a schematic diagram of a construction of a second preferred embodiment in accordance with the present invention. FIG. 3 is a schematic diagram of a construction of a third preferred embodiment in accordance with the present invention. FIG. 4 is a schematic diagram of a construction of a fourth preferred embodiment in accordance with the present invention. A preferred embodiment of the mobile induction and power-generation device in accordance with the present invention includes an induction movement magnetic element (10), a displacement magnetic element (20), and a coil (30). The induction movement magnetic element (10) can be driven by an external magnetic field to move along a passive movement trajectory (B). The induction movement magnetic element (10) of this embodiment includes at least one magnetic pole set (12). The magnetic pole set (12) is disposed in a radial direction of the induction movement magnetic element (10). The magnetic pole set (12) rotates around a rotation axle (14). The magnetic pole set (12) has a major magnetic pole direction pointing from a S-pole to a N-pole. The major magnetic pole direction is preferably disposed radially relative to the rotation axle (14) or an angle between the magnetic pole direction and the rotation axle (14) in the radial direction is less than 30 degrees. The induction movement magnetic element (10) of this embodiment is disc-shaped and includes a magnetic pole set (12). The magnetic pole set (12) has a semicircular N-pole and a semicircular S-pole. The rotation axle (14) is disposed at an axial direction of the induction movement magnetic element (10). The direction of the passive movement trajectory (B) is the circumferentially tangent direction of the rotation axle (14).

The magnetic field of the displacement magnetic element (20) can move along a movement trajectory (A) relative to the induction movement magnetic element (10). The so-called movement along the movement trajectory (A) is further described below. Each one of the at least one magnetic pole set of the displacement magnetic element (20) having at least two adjacent magnetic poles (24) with opposite polarities has a positional relationship with the induction movement magnetic element (10). The positional relationship changes along the movement trajectory (A), meaning the induction movement magnetic elements (10) or the displacement magnetic element (20) relatively move or rotate. The so-called two adjacent magnetic poles with opposite polarities are not limited to the N-pole and the S-pole of the same magnet, but can be two adjacent or contacting magnets whose N-poles and S-poles are disposed opposite each other. The movement direction of the displacement magnetic element (20) along the movement trajectory (A) can correspond with the axial direction of the induction movement magnetic element (10) as shown in FIG. 1 or a tangent direction when the induction movement magnetic element (10) is rotated as shown in FIG. 2. The movement trajectory (A) can be linear as shown in FIG. 1, or can be an arc path as shown in FIGS. 3 and 4. Thus, the polarities of the magnetic poles will change repeatedly relative to the induction movement magnetic element (10) when the adjacent magnetic poles with opposite polarities of the displacement magnetic element (20) move along the movement trajectory (A). When the polarities of the magnetic poles change repeatedly, the induction movement magnetic element (10) will be attracted or guided to move along the passive movement trajectory (B).

As shown in FIGS. 1-3, in order to extend or maintain the movement of the displacement magnetic element (20), a movement promotion element (22) can be used and contacted with the two adjacent magnetic poles (24) with opposite polarities. In this embodiment, the two adjacent magnetic poles (24) with opposite polarities area N-pole and a S-pole of a block magnet. The movement promotion element (22) is a spring, a reed (221) or another vibration or rotation maintaining structure connected to the block magnet. When the block magnet moves because of external conditions, the spring or reed can extend the movement of the block magnet.

Figure 5:
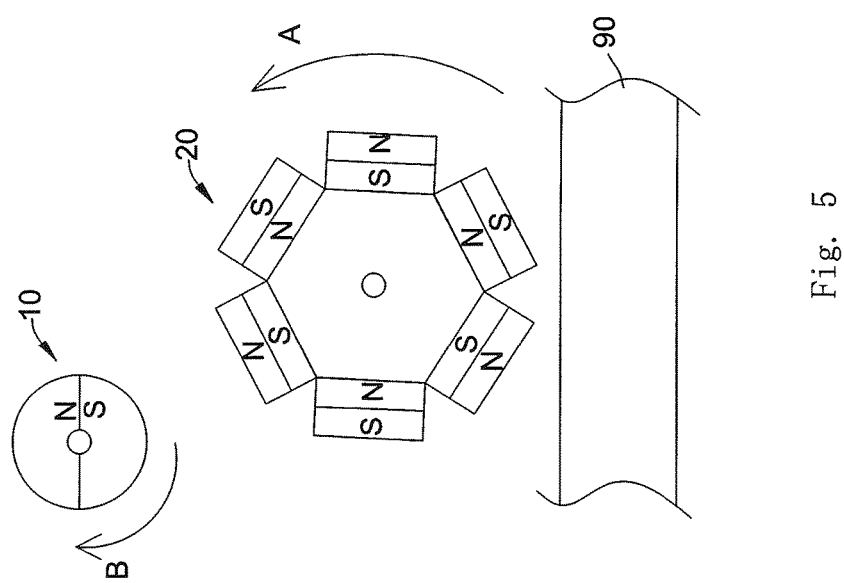
FIG. 5 is a schematic diagram of the fourth preferred embodiment in accordance with the present invention in use.
Figure 7:
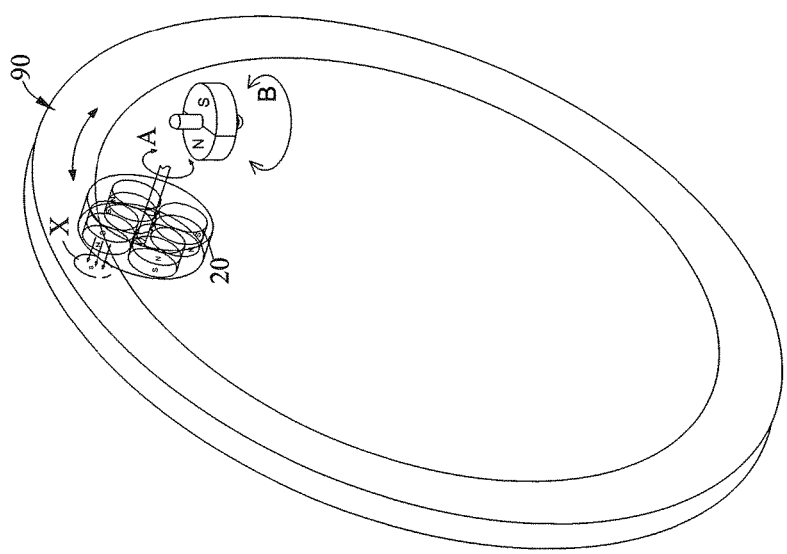
FIG. 7 is another schematic diagram of the fourth preferred embodiment in accordance with the present invention in use.

With reference to FIGS. 4, 5 and 7, FIG. 5 is a schematic diagram of the fourth preferred embodiment in accordance with the present invention in use. FIG. 7 is another schematic diagram of the fourth preferred embodiment in accordance with the present invention in use. The displacement magnetic element (20) may comprise multiple magnets disposed in a circular arrangement, and two adjacent magnets have opposite magnetic poles. Thus, the displacement magnetic element (20) includes multiple magnetic poles set each having two adjacent magnetic poles with opposite polarities. The circular arrangement of two adjacent magnetic poles with opposite polarities of each magnet is preferably toward a radial direction (as shown in FIGS. 4 and 5) or an axial direction (as shown in FIG. 7) of a circle. However, it is also effective even if there is an angle between each magnetic pole and the radial direction or the axial direction, and the angle is preferably 0-30 degrees. When the displacement magnetic element (20) rotates along the movement trajectory (A), the magnetic poles of the displacement magnetic element (20) keep changing, causing the magnetic pole set (12) of the induction movement magnetic element (10) to move along the passive movement trajectory (B).

The above-mentioned rotation maintaining structure may be a winding structure, a ratchet rotating structure, etc. After winding up, the winding structure can keep the displacement magnetic element (20) rotating for a period of time. The ratchet rotating structure can keep rotating in a specific direction for a period of time by pressing or swinging the ratchet rotating structure.

In practical use, magnets disposed in the circular arrangement can be close to a moving metal (90). When the moving metal (90) has a relative movement relative to the displacement magnetic element (20), the moving metal (90) will be induced magnetically and generate an eddy current, bringing each magnet of the displacement magnetic element (20) to rotate along the movement trajectory (A). The induction movement magnetic element (10) is then induced by the alternating displacement magnetic element (20) and rotates or swings.

Figure 6:
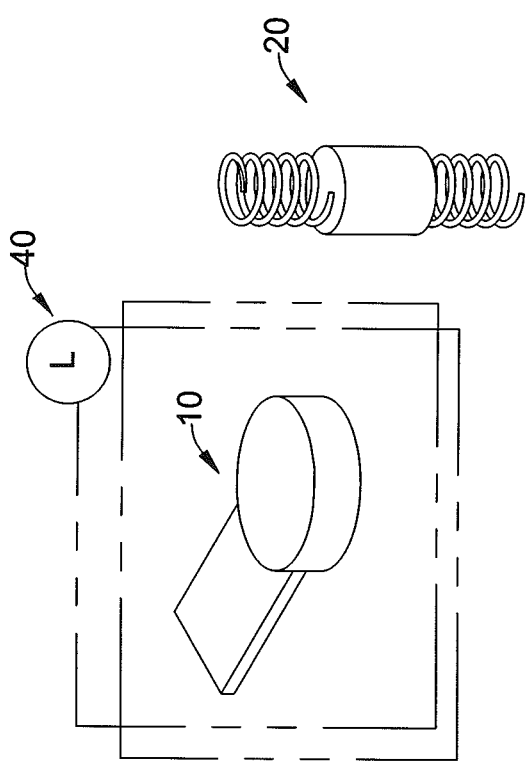
FIG. 6 is a schematic diagram of a construction of a fifth preferred embodiment in accordance with the present invention.

With reference to FIG. 6, FIG. 6 is a schematic diagram of a construction of a fifth preferred embodiment in accordance with the present invention. The induction movement magnetic element (10) may be a magnet with a spring or a reed mounted thereon. When the displacement magnetic element (20) moves along the movement trajectory (A), the induction movement magnetic element (10) is attracted or repelled and vibrates.

The coil (30) is disposed adjacent to the induction movement magnetic element (10) or/and the displacement magnetic element (20), and is induced by an alternating magnetic field generated by the movements of the induction movement magnetic element (10) or/and the displacement magnetic element (20). The coil (30) generates an induction current due to the alternating magnetic field. The coil (30) may be connected to a load (40), so the load can work due to the induction current. The winding direction of the coil (30) as shown in FIGS. 1, 2, 3, 4, and 6 is only for illustration. The preferable winding direction for generating the induction current must correspond with the direction of the alternating magnetic field. The principle of better winding is known in the art, and unnecessary details are omitted herein.

The load (40) may be a light-emitting device (e.g. LED or OLED), a wireless signal transmitting module (e.g. RF transmitter or WIFI transmitter), a sensor (e.g. temperature, pressure, humidity or heart rate), or an electricity storage device (e.g. rechargeable battery or super capacitor).

In practical use, the coil (30) can be disposed around and outside the induction movement magnetic element (10). The displacement magnetic element (20) moves along the movement trajectory (A) due to movement or vibration from external conditions. The coil (30) generates a current input to the load (40) due to the alternating magnetic field generated from the movement of the induction movement magnetic element (10). A portion of the induction movement magnetic element (10) and a portion of the coil (30) can be mounted in the same housing. Because the displacement magnetic element (20) can have the movement promotion element (22), vibration or movement of the housing can be extended when the housing is forced to move or vibrate. Thus, the induction movement magnetic element (10) can be driven to have a relative movement, and the coil (30) is induced to generate electricity. In one practical example, the induction movement magnetic element (10) and the displacement magnetic element (20) can be mounted on a runner or a bicycle. Thus, the displacement magnetic element (20) can vibrate with the movement of the runner or the bicycle to achieve the objective of electricity generation.

Further, the displacement magnetic element (20) can also have a single magnetic pole toward the axial direction of the rotation axle (14) of the induction movement magnetic element (10) and moves back and forth in the radial direction of the rotation axle (14) or moves eccentrically in the axial direction of the rotation axle (14). Because the induction movement magnetic element (10) can include two magnetic poles with opposite polarities, the magnetic poles mutually attracting the displacement magnetic element (20) will move as the displacement magnetic element (20) moves, making the induction movement magnetic element (10) swing or rotate and generating an electricity output.

From the description above, it will be understood that the present invention has the following benefits:

1. With the induction movement magnetic element (10) and the displacement magnetic element (20), the present invention can convert slight vibration delicately to cause the induction movement magnetic element (10) to move, to achieve the objective of electricity generation.

2. Because the magnetic field of the displacement magnetic element (20) interacts with the induction movement magnetic element (10), the coil (30) is induced by a stronger or more concentrated magnetic field. Thus, an effect of improving electricity generation is achieved.

3. The electricity source of the present invention comes from the induction electricity generated by moving or vibrating magnetic elements to drive the induction movement magnetic element and the coil. With the design of this mechanism, slight vibration can be collected effectively and converted into an electricity output.

4. The present invention can be used to recharge at a distance. The induction movement magnetic element (10) can be integrated with or connected electrically to an electricity utilization device, and the displacement magnetic element (20) is moved relative to the induction movement magnetic element (10). Thus, an excellent and efficient effect of recharging at a distance can be achieved. Because the movement of the displacement magnetic element (20) can be driven without an electricity supply, such as using a winding mechanism, recharging at a distance is environmentally friendly.

The above describes only some preferred embodiments of the present invention. Although the present invention has been disclosed with reference to the preferred embodiments above, the present invention is not limited by these preferred embodiments. Skilled artisan artisans in the art should be able to use the present disclosure above to propose equivalent embodiments with slight equivalent alternations or modifications without departing from the scope of the present disclosure. Any simple changes, equivalent alternations or modifications are still within the scope of the present invention.

What is claimed is:

1. A mobile induction and power-generation device comprising:
   a disc-shaped magnet, with the disc-shaped magnet including a semicircular N-pole and a semicircular S-pole, and configured to rotate around a rotation axle disposed in an axial direction of the disc-shaped magnet and a passive movement trajectory in a circumferentially tangent direction of the rotation axle;
   a block magnet, wherein the block magnet includes a N-pole and a S-pole of a magnetic pole set and vibrates along a movement trajectory relative to the disc-shaped magnet, with the block magnet actuating the disc-shaped magnet to move along the passive movement trajectory, wherein the block magnet includes a movement promotion element connected to or contacted thereon, and wherein the movement promotion element is a spring or a reed; and
   a coil, wherein the coil is wound around and outside the disc-shaped magnet and generates a current due to an alternating magnetic field when the disc-shaped magnet is attracted to move along the passive movement trajectory,
      wherein the disc-shaped magnet and the coil are mounted in a housing,
      wherein polarities of the block magnet change relative to the disc-shaped magnet when the N-pole and the S-pole of the block magnet move along the passive movement trajectory,
      wherein when the polarities of the block magnetic change, the disc-shaped magnet is attracted to move along the passive movement trajectory,
      wherein the coil is connected to a load, with the load being a light-emitting device, a wireless signal transmitting module, a sensor, or an electricity storage device, and
      wherein the disc-shaped magnet is driven by the block magnet to move along the passive movement trajectory.

* * * * *